United States Patent [19]

Falk

[11] 4,190,531
[45] Feb. 26, 1980

[54] METHOD OF CONCENTRATING AND COLLECTING OIL SPILLS

[75] Inventor: Robert A. Falk, New City, N.Y.

[73] Assignee: Ciba-Geigy Corporation, Ardsley, N.Y.

[21] Appl. No.: 866,674

[22] Filed: Jan. 3, 1978

[51] Int. Cl.$^2$ .............................................. C02B 9/02
[52] U.S. Cl. .............................. 210/62; 210/DIG. 27
[58] Field of Search ................... 210/DIG. 27, 40, 59, 210/62

[56] References Cited

U.S. PATENT DOCUMENTS 3,810,835   5/1974   Ferm .......................... 210/DIG. 27

FOREIGN PATENT DOCUMENTS 50-22783   3/1975   Japan .............................. 210/DIG. 27
51-113356  10/1976  Japan .

*Primary Examiner*—Thomas G. Wyse
*Attorney, Agent, or Firm*—Michael W. Glynn

[57] ABSTRACT

Oil spills can be more effectively concentrated, collected, and controlled by employing a durable, rapidly spreading, water-insoluble surface film comprised of a fluorochemical. The fluorochemical agent has a density greater than water, a solubility of less than 0.01% in water, a spreading pressure preferably of $>50$ dynes/cm at $<10$ mg/m$^2$, and is applied with a diluent to form a highly mobile film under actual field conditions. Useful fluorochemicals are those of the formula $(R_f)_n T_m Z_r$, wherein $R_f$ is a perfluorinated aliphatic group, T is a connecting group, and Z is a neutral or polar group; n is 1 or 2, m is 0 or 1, and r is 1 or 2. The film is especially effective under adverse environmental conditions, and in combination with mechanical clean-up devices.

2 Claims, No Drawings

METHOD OF CONCENTRATING AND COLLECTING OIL SPILLS

BACKGROUND OF THE INVENTION

Oil spills represent the most damaging insult to our environment and the ever-increasing recurrence of such accidents has made the containment and cleanup responses a subject of national importance.

The "National Oil and Hazardous Substances Pollution Contingency Plan", Council on Environmental Quality, 40CFR, 1510, Federal Register, Vol. 40, No. 28, Feb. 10, 1975, was devised to protect the environment from the damaging effect of pollution discharges. Under the Plan and Annexes detailed responses are outlined for various contingencies, the most frequent being the hazardous discharge of oil to an aqueous environment. Cleanup responses are detected on a case by case basis and both mechanical and chemical cleanup agents are employed.

Chemical agents are defined as elements, compounds or mixtures that disperse, dissolve, emulsify . . . concentrate . . . entrap . . . or otherwise facilitate the removal of the pollutant from the water. The subject agents are in particular "surface collecting agents," which are a surface film forming chemical for controlling oil layer thickness and provide a key element in the most effective system for concentrating and collecting oil spills.

The basic concept of using surface active agents to drive oil from the vicinity of sinking ships was described by Zisman at the U.S. Naval Research Laboratory in 1943. After a lapse of many years, the refinement and application of monomolecular films as oil collectors to control oil pollution was re-examined at the U.S. Naval Research Laboratory in the late sixties.

Oil collectors are surface active agents that are capable of forming monolayers on a water surface and thus prevent the spreading of oil lenses, or compress thin oil films into thicker lenses. The criterion necessary to attain spontaneous spreading of two immiscible phases has been taught to Harkins et al, *J. Am. Chem. Soc.* 44, 2665 (1922). The measure of the tendency for spontaneous spreading or spreading pressure of an oil is defined as follows:

$$F_o = \gamma_w - (\gamma_o + \gamma_{o/w})$$

where
$\gamma_w$—surface tension of water
$\gamma_o$—surface tension of oil
$\gamma_{o/w}$—interfacial tension between the oil and water The measure of the spreading pressure of a collector is defined as follows:

$$F_h = \gamma_w - \gamma_w^h$$

where $\gamma_w^h$ is the surface tension of water in the presence of collector. $F_h$ and $F_o$ are thus the opposing spreading pressures of the collector and the oil respectively in dynes/cm. Since the surface pressures of crude oils and refined petroleum products generally vary between 10 and 33 dynes/cm, a minimum opposing pressure of 40 dynes/cm should suffice. In actuality, available oil collectors give surface pressures of 35 dynes/cm at 5 milligrams/square meter and higher spreading pressures of 43–46 dynes/cm only when applied at two to four times greater concentration. This spreading pressure is generally sufficient for clean oil in confined calm areas, but insufficient for weathered or aged oil slicks in unconfined areas especially in the presence of winds, waves and dispersants. Fluorochemical oil collectors as described herein are considerably more effective.

The oil lens thickness maintained by a collector is predicted by the Langmuir equation (J. Chem. Phys. 1, 756 (1933))

$$t^2 = \frac{2(F_h - F_o)P_w}{g P_o (P_w - P_o)}$$

where t is the thickness of the oil layer in cm $F_o$ and $F_h$ are as previously defined, and $P_w$=density of water phase, gm/cc; $P_o$=density of oil layer, gm/cc; g=gravitational constant, 980 cm/sec².

Consequently for a particular oil, the higher the opposing spreading pressure of the collector, the greater the thickness.

If the oil spilled on water has a low spreading pressure, the spreading rate will be fairly slow and the oil will tend to remain in a relatively thick layer on the water. In this case of a thick oil layer, some mechanical oil skimmers will work very effectively, especially if waves are less than 1 ft. high.

If the oil spilled has a high spreading pressure, which is generally the case, the oil will spread to an extremely thin layer, on the order of microns in thickness. Thin oil slicks are literally impossible to remove in a practical sense, even with the more efficient skimming devices.

The efficiency of any oil-spill pick-up scheme for use offshore is directly related to the thickness of the oil layer and the severity of the weather. There are many mechanical skimming devices available that operate with good efficiency on thick oil layers (say ¼ to 1 in.) in calm water. There are no mechanical skimming devices that work effectively on thin oil slicks. Since offshore weather conditions generally preclude a calm sea and since there usually is little time to respond effectively to an oil spill, it appears that mechanical skimming alone will not suffice except in very special cases, and more efficient collectors could be quite useful.

Other practical limitations effecting the use of prior-art oil collecting agents are noted below:

Since the evaporation of volatile components is a significant mechanism of aging of crude oil slicks and the residual slicks are difficult to collect, it has been suggested that natural surface active materials are present. This suggests the need of applying surface collecting agents only on fresh spills of such oils. Presently available collectors are ineffective in the presence of such natural competing surfactants, while the subject fluorochemical collectors are far more effective.

Prior-art collectors initially spread rapidly (about 40 cm/sec) and then more slowly due to the progressive effects of gravity and inertial flow, gravity and viscous flow, and surface and viscous flow. The initial high spreading rate is usually reduced to 3 to 4 cm/sec after about a minute, but then remains fairly constant, reducing inversely as the square root of time until the film approaches a thickness of several molecules. As the thickness approaches monomolecular dimensions the spreading rate approaches zero.

Since spreading velocity generally increases with spreading pressure, and the subject collecting agents have such high spreading pressures, they spread very rapidly. This is true in general with fluorochemical agents in contrast to the conventional hydrocarbon based collecting agents. Differences in spreading velocity are also expected within any homologous series of candiate agents depending on the chemical functionality, solubility and molecular weight of the compounds in question.

The ability of collecting agent to spread against wind also increases with increasing spreading pressure.

Finally, prior-art oil collectors are minimally effective on dispersant oil mixtures, particular at high dispersant levels. The subject collectors are generally effective even on such contaminated oil mixtures.

In 1974 a patent was issued to Shell Internationale for compositions suitable for herding oil or preventing it from spreading (South African Pat. No. ZA 7300 346), which comprise at least one primary long chain aliphatic alcohol having 10 to 20 carbon atoms together with a liquid and/or solid diluent material. U.S. Pat. No. 3,810,835 issued in 1974 to Chevron Research Co. discloses aliphatic oil slick containment agents selected from dialkyl amides, n-alkyl and n-alkenyl polyethylene glycol ethers, polyethylene glycol monoesters of n-alkanoic acid, and n-alkyl and n-alkenyl monoesters of propylene glycol. Japanese Pat. No. 49-4675 discloses the use of poly (oxyalkylene) alkyl ethers.

The use of fluoroalkyl group containing surfactants or aqueous solutions thereof are claimed in Japanese Pat. No. 50-22783 issued in 1975. The patent fails to teach the use of low melting, water-insoluble fluorochemicals useful at practical levels below 10 $mg/m^2$. The disclosed compositions and examples are water soluble, high melting and ineffective.

Detailed Disclosure

An improved method of concentrating, collecting and controlling oil spilled in water which method comprises spreading around the periphery of said oil a composition containing from 0.1 to 95.0% of a fluorochemical which has a solubility in water of less than 0.01% and the balance a diluent which has a solubility in water greater than 0.01%, said composition forming a durable, rapidly spreading, water-insoluble surface film. The fluorochemical agent has a density greater than that of water, a spreading pressure of >50 dynes/cm at <10 mg/m, and can be applied neat or with a diluent to form a highly mobile film under actual field conditions.

Particularly useful are fluorochemicals of the formula:

$$(R_f)_n T_m Z_r$$

where n is 1 or 2, m is 0 or 1, and r is 1 or 2. $R_f$ is one or two straight or branched chain perfluoroalkyl groups of 1 to 20 carbon atoms or said perfluoroalkl substituted by perfluoroalkoxy of 2 to 6 carbon atoms, or said alkyl not exclusively substituted by fluorine but also containing at most one chlorine or hydrogen atom for every two carbon atoms.

T is a covalent bond, or a connecting group with a functionality of n+r for linking a maximum of 2 $R_f$-chains and 2 Z groups, said T being $R_3$ or $R_3(X—R_4)_p$ where $R_3$ and $R_4$ are independently straight or branched chain, saturated or unsaturated, halo substituted, alkylene or arylene groups of up to 12 carbon atoms, and —X— is variously a thio, oxy, or imino function where in said imino group the nitrogen atom is secondary or tertiary and p is 1 to 4; Z is one or two neutral or polar groups selected independently and preferably from $—CONR_1R_2$, —OH, —CN, $—CONR_1COR_2$, $—SO_2NR_1R_2$, $-(O_2CR_1)$, and $—CO_2R_1$, where $R_1$ and $R_2$ are independently hydrogen, straight or branched chain alkyl of 1 to 12 carbons or straight or branched chain alkyl of 1 to 12 carbons substituted with one or more —OH, $—COCH_3$, or $—CONH(CH_3)$ functions but which in the special case where $R_f$ contains 6 or more carbon atoms, especially 10 or more may also include highly polar functions chosen from anionic or cationic groups such as $—CO_2H$, $SO_3H$, $—PO(OH)_2$, $—OSO_3H$, $—S_2O_3Na$ or quaternary ammonium, provided that the solubility of the resultant fluorochemical in water is less than 0.01%.

The $R_f$ group can be, as stated above, broadly a perfluoroalkyl of 1 to 20 carbons, but preferably it is a perfluoroaliphatic of 5 to 14 carbon atoms.

The fluorochemical terminates in a covalently bonded group $—T_mZ$ which is not critical as such. However, the overall solubility and physical properties as determined by the interrelationship of the moieties $R_f$, T and Z are important is establishing the effectiveness of the collecting agent. It is generally necessary that the combination of the fluorinated radical and the terminating group be so balanced that the solubility in water at 25° C. is minimal, generally below 0.01% by weight, and that the fluorocarbon-diluent composition is low melting, preferably liquid at room temperature and even more preferably remains fluid at 0° C. (32° F.). The relatively simple expedient of utilizing mixtures of telomeric $R_f$-groups contributes toward attaining such low melting eutectic fluids. The use of a diluent for the fluorochemical also contributes to maintaining the fluidity of the composition at low temperatures.

Suitable as diluents are solvents in which the fluorochemical is at least 0.1% soluble, which are environmentally acceptable, have low toxicity, a high flash point, melting point <0°, a density below 1.0, are readily available, and which are wholly miscible with water or soluble in water at least to the extent of 0.01%.

Prior-art collecting agents were generally not useful if they had a density greater than that of water, since they would sink. Unexpectedly, this consideration is not valid for the composition used in this invention which may have a density much higher than that of water, but are useful. This is so, because the fluorochemical type collecting agents possess such high spreading velocities that the agent spreads before the local surface thickness exceeds the limiting value when gravity will cause droplets to coalesce and sink. Once the agent has spread to a useful molecular thickness, strong surface tension forces act as a protective skin capable of supporting the dense collecting agent and preventing it from sinking regardless of its density.

It is particularly useful to use solutions of the fluorochemical agent in a low density diluent with other appropriate properties and also having a finite solubility in water. This permits the application of a solution of the collecting agent at a density less than that of water, which floats and acts as a reservoir for additional fluorochemical agent as needed, yet which ultimately dissolves and does not leave a surface film.

The perfluorinated component has a very limited solubility in water, but has an enhanced solubility in the presence of a conventional water-soluble fluorinated surfactant. Thus mixtures of said perfluorinated component and foaming or non-foaming fluorinated surfactants may be of particular use for storage and handling considerations. Such mixtures are disclosed in my copending application Ser. No. 756,031, which is incorporated herein by reference.

Mixtures of the so-called AFFF, i.e., aqueous film forming foams, which are comprised of fluorinated surfactant, hydrocarbon surfactant, solvent, and optionally $R_f$ synergist (disclosed in greater detail in Ser. No. 642,272), plus the instant perfluorinated component can serve a dual function as AFFF composition as well as a surface collecting agent. This combination possibility is most important from an economical as well as safety standpoint, since most municipal, airport, and harbor fire departments are already equipped to disperse AFFF agent (using 3% or 6% proportioning systems) and will have immediately a dual capability for oil spill-/fire control.

Fluorochemical surface collecting agents are not adversely affected by the presence of surfactants or foaming agents and can be formulated into a foaming system by incorporating protein hydrolysate, conventional anionic sulfates and sulfonates, such as sodium lauryl sulfate or α-olefin sulfonates, amphoteric surfactants such as the partial sodium salt of N-lauryl B-iminodipropionic acid, or natural and synthetic polysaccharide gums such as guar xanthan, or derivatives thereof.

Further the reservoir effect of a foam blanket, especially if colored, serves to improve the visibility of the barrier and can function to discourage water-fowl from landing.

It must be stressed that the active, durable collecting agent is the insoluble monolayer forming fluorochemical. Solvents if used must be chosen carefully so as not to detract from the performance. Preferred collecting agents are neutal and compatible with a wide variety of solvents and materials of construction.

The subject fluorochemicals are readily attainable derivatives. They may contain a mixture of fluorinated end groups from $C_4F_9$- To $C_{20}F_{41}$-, or be a particular length as derived from Simons Cell technology. While they can have diverse functionalities the most effective collecting agents are neutral yet contain highly polar functions and most preferably polar functions than can be solubilized by hydrogen bonding. Strongly acidic or basic, corrosive, exceedingly volatile, or otherwise unstable fluorochemical derivatives are not recommended for purposes of this invention.

The subject compositions far exceeds the performance of conventional hydrocarbon based surface collecting agents, (South Africa ZA 7300 346), and can be used in lieu thereof. These prior-art agents have numerous deficiencies. Shell Oil Herder solidifies at 36° F., which places a low temperature limit on its use. Although it is somewhat effective in protecting sand and wet beaches, it is less effective in restoration of oil-fouled beaches. Further, its protection to a shoreline is of short duration since it must be applied after each high tide and requires continuous supervision. It is not useful in arctic regions. Climatic factors cause evaporation and loss of the desired effect and wind may adversely affect its application if it is used as a spray. Environmentally, such hydrocarbon collectors have tested out as having low toxicity, though similar nonionic surfactants are relatively toxic, thus leaving this property in doubt. Application costs are relatively low, though the necessity for multiple applications rapidly increases the costs.

The inherent solubility of prior-art agents in petroleum oils severely limits their use and durability. The subject fluorochemical agents encompass a variety of compositions and may be applied at various percent actives depending on the actual application.

Examples of the special utility of the subject compositions follows:

Utility of Invention

It will work on any normal petroleum, vegetable oil, or water immiscible solvent slick.

It can be used in salt or fresh water, or even the open sea when wave conditions permit.

It can be used even in the presence of soap or detergent residues frequently resulting from the prior applications of dispersants, or less effective collecting agents to the oil spill.

It can be applied as a dilution of a concentrate since it is so efficient, consequently lesser amounts of concentrate need be stored.

It can be used in the presence of an AFFF agent (or be an AFFF agent) which will not only collect but protect volatile fuels from ignition as they are concentrated and the hazard increases.

It can be used on arctic spills; prior art agents cannot be so used.

Its high surface pressure and superior spreading velocity can maintain a film in rougher seas, higher wind conditions and against stronger currents, than prior art collecting agents.

It can form a particularly thick oil even from light refined oil fractions which can then be more readily removed.

It can work more efficiently than prior art materials on thick oil layers of higher viscosity.

It can work even against oil-in-water emulsions.

It can be used under more severe weather conditions than prior art materials since it gives an inherent improvement in surface pressure of almost 25%.

It can contain a slick for extended times, due to its improved durability.

It can be applied as a dilution or concentrate as a liquid, powder or foam from hand-operated units, drip-pots, or helicopter-supported application units.

It is particularly nontoxic to fish and is anticipated to be notoxic to other species as well. This is in marked contrast to presently available collecting agents.

It is slowly biodegradable and hence does not shock the environment.

It contains no heavy metals, or harmful chemicals and presents no health or toxicity hazard in handling.

It can be used to confine oil spills in sufficiently thick layers that burning can be effective.

It can be applied as an impregnated powder, rope, or other porous or rigid device.

It can be used to protect beaches threatened by spills.

It can be used to treat birds and marine life so as to remove oil from their feathers.

It can decrease petroleum pollution from such point sources as petroleum oil refineries, taker operations, and offshore drilling rigs.

It can markedly increase the efficiency of containment/mop-up operations.

It can be used in small concentration and thus minimize environmental factors and operational considerations such as depolyment and recovery problems.

It can be used more effectively on aged crude oil slicks, which because of naturally occurring residual surfactants are usually resistant to conventional herding agents.

It can be formulated with suitable solvents so as to have a high flash point, low pour point, and perform at arctic temperatures.

The cheapest and most advantageous methods of oil recovery are suction devices and containment booms. The subject materials appreciably aid such techniques.

Candidate collecting agents are chosen with particular regard to the following criteria:

1. Physical State—Liquids are preferred, but solids can be effectively used in solution.
2. Maximum Film Pressure—Preferred candidates have a film pressure greater than 50 dynes/cm.
3. Relative Durability—Preferred candidates are 10–1000 fold more durable than prior-art collecting agents.
4. Minimum Effective Surface Concentration—Less than 10 mg/meter$^2$ is required to maintain a film pressure of 50 dynes/cm.
5. Viscosity—In solution, the subject materials exhibit low viscosities and preferred candidates less than 500 cs at 0° C.
6. Density—Contrary to prior-art materials, the high surface activity of the subject agents permits them to be used in solution even at densities greater than that of water.

Candidate screening is divided into 4 stages.

Stage 1—Maximum (Neat) Film Pressure

The candidates are tested neat at excess for maximum $\pi$ by the Wilhemy Plate Method.

Stage 2—Maximum Film Pressure - Persistence

The candidates showing $\pi$ max>35 as liquids or which are promising solids are retested as 75% solutions in butyl cellosolve. One $\mu$l is applied on a water surface and $\pi$ is monitored for 20 minutes.

Stage 3—Film Pressure Versus Concentration

Candidates showing $\pi$ max >50 dynes/cm are tested by incremental additions of 2% solutions at one minute intervals to generate film pressure versus concentration (mg/m$^2$) curves. Persistence of the film pressure is recorded.

Stage 4—Dynamic Durability Evaluation

Candidates showing $\pi$ max >50 dynes/cm at <5 mg/m$^2$ and persistence in Stage 3 are photographically evaluated for oil film clearing ability and durability in a rocking pan test. The test is run with a 3 $\mu$l sample, 125 ml used motor oil, 1 l. H$_2$O, in a 660 cm$^2$ pan vibrated at 125 cycles/min at a linear displacement of 1.27 cm. Comparisons are made to reference surfactants and conventional collecting agents.

A very suitable class of liquid diluents in that of the normally liquid aliphatic compounds which contain at least one polar group in their molecules, and of mixtures of such compounds. Examples of polar groups which may be present are the hydroxyl, ether, ester, keto, keto-alcohol, keto-ether, keto-ester or ether-alcohol groups. Specific classes of such compounds are the ether and ester derivatives of alkylene glycols, alcohols, and ketones.

Whereas the ether and ester derivatives of alkylene glycols or mixtures of the same, are normally employed without the addition of any further liquid diluent, it may be preferable to add one or more lower aliphatic alcohols having at most 3 carbon atoms in their molecules as a further liquid diluent material when making use of a less soluble fluorochemical agent, perhaps with a higher telomer content.

The addition of such lower aliphatic alcohols is not be be excluded either, when ether and ester derivatives of alkylene glycols, alcohols, ketones or mixtures of the same, are to be employed. In general, the liquid diluents are added to obtain optimum spreading properties, highest surface pressure, and minimum pour points. The liquid diluent material should be capable of preventing the solidification of the total liquid blend at 32° F. (0° C.) or even at −20° F. (−29° C.).

The liquid diluent also functions to reduce the density of the perfluorinated component. It may be water miscible, or only sparingly soluble so as to aid the active agent to spread uniformly and not accumulate locally and sediment. The compositions, preferably, contain one or more fluorochemical agents in an amount sufficient to render the sum of the surface tension of the oil and oil/water interfacial tension appreciably greater than the effective surface tension of the water, after the water surface has been treated with the composition. Generally, the concentration of the said fluorochemical collectors is in the range of from 0.1% to 95% by weight, of the composition. Preferably for economic and practical considerations the concentration can be from 2% to 20%.

Preferably, the components to be blended should be so selected that the active ingredients within the resulting composition readily spreads to a film of monomolecular thickness essentially insoluble in water.

Preferred among the ether and ester derivatives of alkylene glycols which may be used as diluents in the compositions of the invention, are those which can be represented by any one of the following general formulae:

| | |
|---|---|
| R'—(OR")$_n$—OH | (1) |
| R'—(OR")$_n$—OR' | (2) |
| R'COOR"—OH | (3) |
| R'COO(R"—O)$_n$OH | (4) |
| (5) R'COOR"—COOR' | (5) |
| R'COO(R"—O)$_n$R'OOCR' | (6) | wherein each of the R's independently represents an alkyl radical of from 4 to 20 carbon atoms, R' is an alkylene radical of 2 or 3 carbon atoms, and n is either 1 or 2. Particularly preferred are those in which R' has from 4 to 10 carbon atoms, which means that a monoalkyl ether of ethylene or propylene glycol is employed, in which the alkyl group has from 4 to 10 carbon atoms. Of course, mixtures of ethers of this class may also be employed. Examples of such ethers are the monobutyl and monohexyl ethers of ethylene glycol, propylene glycol and diethylene glycol. Compounds of this class can be prepared by methods well known in the art. Most preferred solvents are the monobutyl or isobutyl ethers of ethylene or propylene glycol.

An important class of compositions of the present invention are those which comprise in addition to the fluorochemical agent a monobutyl ether of ethylene of propylene glycol, isomeric hexanols, or methyl amyl ketone as diluents Particularly suitable are blends in which the fluorochemical collector is present in a proportion below 50% by weight of the composition and the resultant composition has a density of approximately 0.95 g/cc.

Perfluorinated component can also be released from a solid carrier material. The solid carrier materials may, e.g., be water-soluble so that the liquid is set free as the carrier dissolves in the water upon application. However, the carrier materials may also be water-insoluble, the liquid being slowly leached from the carrier upon application to the oil-polluted water. The liquid collector mixed with the carrier material may only consist of one or more fluorochemical agents, but it may also additionally comprise one or more liquid diluent materials as defined above.

Preferred carrier materials, both the water-soluble and the water-insoluble ones are polymers. Suitable polymers are naturally occurring materials, including, e.g., polysaccharides and gums, as well as manufactured materials, including, e.g., carboxymethyl cellulose, carboxyvinyl polymers, carbopol polyamides, polyurethanes, polyvinylpyrrolidone, polyesters of polycarboxylic acids, polyolefin oxides, polyacrylates, polymethacrylates, polyvinyl ethers and polyvinyl alcohols. The liquid agent can, e.g., be mixed with water and then thickened or gelled with the polymer to obtain a composition which may be a relatively thin liquid, when rapid dispersion of the liquid agent during use is desired, or a thick paste, when slower dispersion of the liquid agent is desired. Of course, the composition may also be in some intermediate condition.

When the liquid agent is incorporated in a water-soluble polymer, the resultant mixture is preferably dried into a desired shape. Mixtures of this kind can be applied as a paint to bodies intended for floating on water. They can be applied in the same manner to tape which can then be attached to solid bodies intended for floating on water.

The process of the present invention consists in applying, preferably to open water areas, near, under, or adjacent to the oil, a composition of the invention as defined in the above, thereby preventing the spreading of oils slicis and/or films or gathering them into a limited, confined area, and then removing the contained oil from the water by chemical or mechanical means.

The collecting agent compositions of the invention can be applied, e.g., by spraying, dumping, injecting and brushing. They can also be encapsulated in the desired quantities within a water-soluble case or bag. A number of such capsules with varying rates of release may be used to control an oil spill during a certain space of time.

Furthermore, it is possible to impregnate a porous solid with the collecting agent composition as such or in a diluted condition. Suitable porous materials include soft materials, e.g., rope, sponge, fabric, cloth and paper, as well as rigid materials, e.g., wood, porous plastic materials and porous stone. Finely divided solids such as vermiculite or various clays can also be used to absorb the compositions or to thicken them when they are already in the form of pastes. These materials can be formed into various sizes and shapes. If necessary or desired, finely divided material can be put into bags to alter the release rate.

Also, the collecting agents can be imbibed into a polymeric substrate from which they can be released at a diffusion controlled rate; e.g. from hydrogels.

Finally the collecting agent can be applied from a foam. The agent may be incorporated in a proteinaceous foaming composition which is particularly stable, thus serving as a drainage source and also serving as a marker delineating where the surface collecting agent has been applied. Conventional surfactant foams might also be used.

The packaging of, and the delivery system for the subject agents is of primary concern to their successful use and is not intended to be limited in scope.

Suitable mechanical equipment for lifting the oil out of the water includes suction devices, skimmers, endless belts and pumps which may, e.g., be used to load the oil into barges. Once collected in any suitable manner the oil may be disposed by burning. It may also be collected, if so desired with the use of natural sorbents such as straw, or polymers.

Reasonable variations and modifications within the scope of the foregoing disclosure, the Examples to be given hereinafter and the appended claims are, of course, possible. One variant of the process as just defined, which should also be regarded as an embodiment of the present invention, is a process in which a composition of the invention is employed to reduce the adherence of oil to beach sand. Preferably, the composition is distributed either at the edge of the water so as to be washed onto the beach or directly onto the sand or other siliceous material. The effect of the process is that the siliceous material is prevented from becoming impregnated with oil. The oil may then be picked up rather easily, for example, by sorbents. The composition of the invention may also be distributed after contact of the sand or siliceous material with oil, and then serve to clean the already oil-polluted material by eluting the oil therefrom.

EXPERIMENTAL PART

Table 1 lists by Example the numerous fluorochemical candidates representative of this invention which have been evaluated. Candidate agents were evaluated for Stage 1—Maximum (Neat) Film Pressure and Stage 2—Maximum Film Pressure Persistence as a 75% solution in butyl cellosolve.

As is shown, neat film pressures on solids may frequently be lower than when the same compound is in solution. Maximum Film Pressures $\pi_{max} > 50$ dynes/cm which are persistent are attained only on select candidates of minimal solubility and of select $(R_f)_n T_m Z_r$ balance and homolog distribution. Several hydrocarbon based agents are included for comparative purposes. Agents which are particularly promising are designated with an asterisk.

TABLE 1

| | | Fluorochemical Collecting Agent Evaluation | | |
| --- | --- | --- | --- | --- |
| Example | Structure | L-Liquid S-Solid State | Stage 1 $\pi$max. | Stage 2 $\pi$20 min. |
| Shell Oil Herder | | (neat) L | 43 | 42 |
| 1 | $C_3F_7CH_2OH$ | L | 13 | |
| 2 | $C_7F_{15}CH_2OH$ | S | 42–47 | 20 |

TABLE 1-continued

Fluorochemical Collecting Agent Evaluation

| Example | Structure | L-Liquid S-Solid State | Stage 1 $\pi$max. | Stage 2 $\pi$20 min. |
|---|---|---|---|---|
| 3 | $C_4F_9CH=CHCH_2CH_2OH$ | L | 44 | 22 |
| 4 | $C_7F_{15}CH=CHCH_2OH$ | L | 48 | 44 |
| 5 | $C_7F_{15}CH=CH(CH_2)_9OH$ | L | 43 | 42 |
| 6* | $C_7F_{15}CH=CHCH_2OCH_2CH_2OH$ | L | 55 | 52 |
| 7* | $C_8F_{17}CH_2CH_2SCH=CHCH_2OH$ | S | 1 | 52 |
| 8* | $R_fCH_2CH_2SCH_2CH_2CH_2OH$ | S | 36 | 55 |
| 9* | $R_fCH_2CH_2SCH_2OCH_2CH_2OH'$ | L | 56 | 52 |
| 10* | $C_8F_{17}CH_2CH_2SCH_2CH_2OH$<br>                             |<br>                        $CH_2CH_2OH$ | S | 53 | 57 |
| 11 | $R_fCH_2CH_2SCHCH_2OH$<br>             |<br>$R_fCH_2CH_2SCH_2$ | S | 41 | 43 |
| 12 | $C_8F_{17}CH_2CH_2SCHCH_2CH_2OH$<br>             |<br>$C_8F_{17}CH_2CH_2SCH_2$ | S | 2 | 46 |
| 13 | $C_8F_{17}CH_2CH_2SCH-(CH_2)_4OH$<br>             |<br>$C_8F_{17}CH_2CH_2SCH_2$ | S | 12 | 47 |
| 14* | $(CF_3)_2CFOCF_2CF_2CH_2CH_2SCHCH_2OH$<br>             |<br>$(CF_3)_2CFOCF_2CF_2CH_2CH_2SCHCH_2OH$ | S | 50 | 51 |
| 15 | $R_fCH_2CH_2SCHCH_2OH$<br>             |<br>$R_fCH_2CH_2SCHCH_2OH$ | S | 47 | 47 |
| 16 | $(CF_3)_2CFO(CF_2)_{6,8}CH_2CH_2SCH-CH_2OH$<br>             |<br>$(CF_3)_2CFO(CF_2)_{6,8}CH_2CH_2SCH-CH_2OH$ | S | 40 | 44 |
| 17* | $R_fCH_2CH_2SCH_2CH_2O(CH_2)_4OH'$ | L | 57 | 54 |
| 18* | $C_8F_{17}CH_2CH_2SCH_2CH_2OCH_2CH_2OH'$ | S | 51 | 57 |
| 19* | $C_8F_{17}CH_2CH_2SCH_2CH_2O(CH_2)_4OH'$ | S | 49 | 57 |
| 20* | $R_fCH_2CH_2S(CH_2CH_2CO_2CH_2CH_2OH)_n$ | oligomer S | 52 | 52 |
| 21 | $C_6F_{13}CH_2CH_2SCH_2CH_2CONHC(CH_3)_2CH_2COCH_3$ | L | 50 | 48 |
| 22* | $C_8F_{17}CH_2CH_2SCH_2CH_2CONHC(CH_3)_2CH_2COCH_3$ | S | 53 | 57 |
| 23* | $R_fCH_2CH_2SCH_2CH_2CONHC(CH_3)_2CH_2COCH_3$ | L-S | 49 | 57 |
| 24 | $C_6F_{13}CH_2CH_2SCH_2CH_2CONH_2$ | S | 47 | insol |
| 26 | $R_fCH_2CH_2SCH_2CH_2CONH_2$ | S | 50 | 48 |
| 27 | $C_6F_{13}CH_2CH_2SCH_2CH_2CN$ | L | 47 | 41 |
| 28 | $C_8F_{17}CH_2CH_2SCH_2CH_2CN$ | S | 17 | insol |
| 29* | $R_fCH_2CH_2SCH_2CH_2CN$ | L | 54 | 50 |
| 30 | Neodol 25 (control) | L | 46 | 47 |
| 31 | $R_fSO_2N(CH_3)CH_2CH_2OH$ | S | 30 | <32 |
| 32 | $C_{10}F_{21}CH_2CH_2SCH_2CH_2OCH_2CH_2OH$ | S | insol | |
| 33* | $C_{10}F_{21}CH_2CH_2SCH_2CH_2O(CH_2)_4OH$ | S | insol | 54 |
| 34 | $R_fCH_2CH_2SCH_2CHOHCH_2OCH_2CH_2OCH_3$ | L | 58 | |
| 35* | $R_fCH_2CH_2SCH_2CHOHCH_2(OCH_2CH_2)_3OCH_3$ | L | 56 | 57 |
| 36* | $R_fCH_2CH_2SCH_2CHOHCH_2OCH_2CH_2O$ Bu | L | 49 | 50 |
| 37 | Arlacel 80 | L | 44 | 36 |
| 38 | Arlacel 20 | L | 47 | 39 |
| 39 | Span 20 | L | 46 | 39 |
| 40* | $C_8F_{17}CH_2CH_2SCH_2CH(CH_3)CO_2CH_2CH_2OH$ | S | 50 | |
| 41* | $C_8F_{17}CH_2CH_2SCH_2CH(CH_3)CO_2CH_2CHOHCH_3$ | L | 58 | 57 |
| 42* | $R_f{}^aCH_2CH_2SCH_2CH_2CONH\ C(CH_3)_2CH_2COCH_2$ | L | 48 | 53 |
| 43* | $C_8F_{17}CH_2CH_2SCH_2CH_2CO_2CHCH_2OH$ | S | 51 | 59 |
| 44* | $C_8F_{17}CH_2CH_2SCH_2CH_2CO_2CHOHCH_3$ | S | 55 | 58 |
| 45* | $R_f{}^bCH_2CH_2SCH_2CH_2CONHC(CH_3)_2CH_2COCH_3$ | L | 48 | |
| 46 | $C_8F_{17}CONHCH_2CH_2OH$ | S | 53 | 46 |
| 47 | $[C_8F_{17}CH_2CH_2SCH_2C(CH_3)CO_2CH_2CH_2OCH_2CH_2]_2O$ | L | | |
| 47*a | $R_f{}^bCH_2CH_2SCH_2CH_2CONHC(CH_3)_2CH_2COCH_3$ | L | 50.0 | 54.5 |
| 48* | $R_f{}^c$ | L | 50.0 | 50.5 |
| 49* | $R_f{}^bCH_2CH_2SCH_2CH(CH_3)CO_2CH_2CHOHCH_3$ | L-S | 54.0 | 54.5 |
| 50* | $R_f{}^c$ | L | 53.5 | 54.5 |
| 51* | $R_f{}^bCH_2CH_2SCH_2CH_2CO_2CH_2CH_2OH$ | S | 56.0 | 54.0 |
| 52* | $R_f{}^c$ | S | 52.5 | 55.5 |
| 53* | $R_f{}^bCH_2CH_2SCH_2CH_2OCH_2CH_2CH_2CH_2OH$ | S | 56.0 | 56.0 |
| 54* | $R_f{}^b$ | S | 56.5 | 55.5 |
| 55* | $R_f{}^c$ | S | 56.0[2] | 51.0 |
| 56* | $R_f{}^cCH_2CH_2SCH_2CH_2CO_2CH_2CHOHCH_3$ | L-S | 57.5 | 51.5 |
| 57* | $R_f{}^b$ | S | 57.5 | 57.0 |
| 58* | $R_f{}^bCH_2CH_2SCH_2CH(CH_3)CO_2CH_2CH_2OH$ | S | 58.0 | 55.5 |
| 59* | $R_f{}^c$ | L | 56.0 | 53.0 |
| 60* | $[C_8F_{17}CH_2CH_2SCH_2CH(CH_3)CO_2]_2-(EG)_4{}^{1a}$ | L | 51.0 | 53.0 |
| 61 | $[C_8F_{17}CH_2CH_2SCH_2CH_2CO_2-]_2\ (EG)_3{}^{1b}$ | S | 50.5 | 48.0 |
| 63* | $C_8F_{17}CH_2CH_2S-CH_2CO_2Bu$<br>            |<br>            $CH_2CO_2CH_2CHOHCH_3$ | L | 51.0 | 51.5 |
| 64* | $C_8F_{17}CH_2CH_2SCH_2CH_2CO_2CH_2CH_2OCH_3$ | L | 53.5 | 53.5 |

TABLE 1-continued

Fluorochemical Collecting Agent Evaluation

| Example | Structure | L-Liquid S-Solid State | Stage 1 $\pi$max. | Stage 2 $\pi$20 min. |
|---|---|---|---|---|
| 65* | $C_8F_{17}CH_2CH_2SCH_2CH_2CO_2CH_2\overline{CHCH_2CH_2CH_2O}$ | L | 49.0 | 51.0 |
| 66 | $[C_8F_{17}CH_2CH_2SCH_2CH_2CO_2CH_2CH_2\!\!+\!\!_2O$ | S | 31 | 43 |
| 67 | $[C_8F_{17}CH_2CH_2SCH_2CH_2CO_2CH_2]_2$ | S | 29 | 42 |
| 68 | $[C_8F_{17}CH_2CH_2SCH_2CH_2CO_2CH_2]_3CC_2H_5$ | S | 26 | 28 |
| 69* | $[C_8F_{17}CH_2CH_2SCH_2CH_2CO_2CH_2]_3CC_2H_5$ distilled | S | 30 | 53 |
| 70 | $C_8F_{17}CH_2CH_2SCH_2CH_2CONHC(CH_3)_3$ | S | 36 | 33 |
| 71* | $C_8F_{17}CH_2CH_2SCH_2CH_2CO_2(CH_2CH_2O)_2C_2H_5$ | L | 52 | 53 |
| 72* | $R_fCH_2CH_2SCH_2CH_2OCH_2CH_2OH$ | L-S | 56 | 50 |
| 73* | 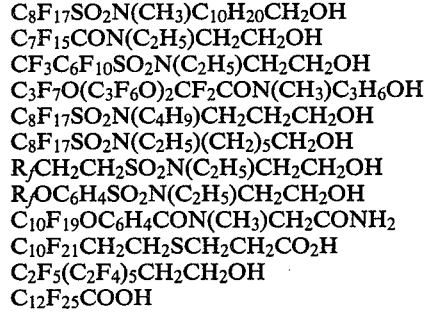 | S | 48 | 58 |

$^aR_f\!\!-\!\!C_6,C_8,C_{10}\text{-}79, 15,1$
$^bR_f\!\!-\!\!C_6,C_8,C_{10},C_{12}\text{-}38,33,16,9$
$^{b.}R_f\!\!-\!\!C_6,C_8,C_{10},C_{12}\text{-}39,33,16,9$
$^cR_f\!\!-\!\!C_6,C_8,C_{10},C_{12}\text{-}31,35,10,2$
[1]Derived from (a) tetraethylene, (b) triethylene glycol
[2]Value drifted In accordance with this invention other fluorochemicals which can be utilized in appropriate solvents as collecting agents include:
$C_8F_{17}SO_2N(CH_3)C_{10}H_{20}CH_2OH$
$C_7F_{15}CON(C_2H_5)CH_2CH_2OH$
$CF_3C_6F_{10}SO_2N(C_2H_5)CH_2CH_2OH$
$C_3F_7O(C_3F_6O)_2CF_2CON(CH_3)C_3H_6OH$
$C_8F_{17}SO_2N(C_4H_9)CH_2CH_2CH_2OH$
$C_8F_{17}SO_2N(C_2H_5)(CH_2)_5CH_2OH$
$R_fCH_2CH_2SO_2N(C_2H_5)CH_2CH_2OH$
$R_fOC_6H_4SO_2N(C_2H_5)CH_2CH_2OH$
$C_{10}F_{19}OC_6H_4CON(CH_3)CH_2CONH_2$
$C_{10}F_{21}CH_2CH_2SCH_2CH_2CO_2H$
$C_2F_5(C_2F_4)_5CH_2CH_2OH$
$C_{12}F_{25}COOH$ Select fluorochemical agents were evaluated through Stage 3 as shown in Table 2. As is shown, select candidates can be found requiring $\leqq 10$ mg/meter² to maintain a $\pi_{max}\geqq 50$. Conventional water soluble fluorochemicals require impractically high concentrations to attain useful surface pressures, as is typified by fluorochemical surfactant FC-134, a product of the 3M Co. Agents which are particularly promising are again designated with an asterisk.

TABLE 2

Fluorochemical Collecting Agent Evaluation (Stage 3)

| Example | Amt. (mg) Needed to Maintain 35 dynes/cm for 1 min. or more | Amt. (mg) Needed to Maintain $\pi$max. | $\pi$max |
|---|---|---|---|
| Shell O.H. | 4.3 | 8 | 46 |
| 6 | 9.1 | 23 | 52→35 |
| 8 | 3.4 | 23 | 55→50 |
| 9* | 3.2 | 11.4 | 55 |
| 10* | 3.4 | 4.8 | 52 |
| 11 | 3.0 | 3.6 | 39 |
| 14 | 8.0 | too soluble | 38 |
| 17* | 2.6 | 4.5 | 53 |
| 18* | 3.4 | 4.8 | 52 |
| 19* | 3.4 | 4.6 | 52 |
| 20 | 4.8 | 23 | 51 |
| 22* | 28 | 3.5 | 51 |
| 28 | 4.6 | 35 | 43 |
| FC-134 | 5.5 | 78 | 55 |

[1]Commercial product of Shell Chemical Co.
[2]Commercial product of 3M Company

Select fluorochemical agents were evaluated through Stage 4 as shown in Table 3, comprising the results of a Dynamic Durability Evaluation. As is shown, the samples designated with asterisks were particularly superior to Shell Oil Herder or a reference sample of Span 20 (sorbitan monolaurate), which has also been recommended as a collecting agent. The fluorochemicals generally excel in initial clearing speed and particularly in long term durability. It is apparent that such fluorochemical collecting agents will function far better than prior-art collecting agents.

TABLE 3

Stage 4
Dynamic Durability Evaluation Results

| Time (min.) | % Cleared | | | | | |
|---|---|---|---|---|---|---|
| | 5 | 15 | 30 | 60 | 90 | 180 |
| Example No. (Table 1) | | | | | | |
| Shell O.H. | 42 | 5 | — | | | |
| Span 20 | 25 | 8 | <1 | | | |
| 9 | 72 | — | 21 | 13 | 5 | 5 |
| 17 | 73 | 48 | 33 | 49 | 38 | 6 |
| 18 | 72 | — | 55 | 32 | 32 | 25 |
| 19 | 71 | 71 | 71 | 54 | 24 | 1 |
| 27 | 60 | 56 | 57 | 58 | 17 | — |
| 40 | 64 | 35 | 13 | 5 | 2 | — |
| 47 | 65 | 31 | 48 | 22 | 10 | 4 |
| 48 | 68 | 47 | 52 | 31 | 15 | 8 |
| 49 | 65 | 55 | 53 | 51 | 49 | 46 |
| 50 | 42 | 40 | 35 | 54 | 30 | 3 |
| 51 | 43 | 44 | 51 | 38 | 37 | 38 |
| 52 | 70 | 62 | 57 | 46 | 42 | 40 |
| 56 | 50 | 44 | 30 | 42 | 23 | — |
| 57 | 69 | 57 | 47 | 35 | 41 | — |

In order to demonstrate the inherent improvement of the subject collecting agents over prior-art materials, a comparative dynamic Stage 4 evaluation was run with No. 2 Fuel Oil, an oil which generally represents a large percentage of spill incidents. As is shown in Table 4, the two commercial collecting agents Exxon OC-5 and Shell Oil Herder failed within 2 minutes whereas preferred Example 56 performed outstandingly.

TABLE 4

Performance with No. 2 Fuel Oil

| Time (min.) | Exxon OC-5[1] % Cleared | Shell Oil Herder % Cleared | Example 56 % Cleared |
|---|---|---|---|
| 1 | failed | 36 | 59 |
| 2 |  | failed | 31 |
| 5 |  |  | 31 |
| 10 |  |  | 25 |
| 20 |  |  | 24 |
| 30 |  |  | 13 |
| 60 |  |  | — |
| 90 |  |  | 17 |

[1]Commercial product of EXXON

In order to demonstrate the use of the subject collecting agent at low temperatures, a comparison was made of Example 52 and Shell Oil Herder at 1° C. The temperature of the dynamic testing container was maintained by immersion in an ice trough. As is shown in Table 5, the percentage of cleared area was greater and the persistence superior with the fluorochemical agent.

TABLE 5

Performance at Low Temperatures

| Time (min.) | Shell Oil Herder % Cleared | Example 52 % Cleared |
|---|---|---|
| 2 | 59 | 67 |
| 5 | 61 | 65 |
| 10 | 60 | 68 |
| 15 | 23 | 66 |
| 20 | 14 | 66 |
| 25 | — | 56 |
| 30 | 2 | 38 |
| 45 |  | 20 |
| 60 |  | 2 |

What is claimed is:

1. A method of concentrating, collecting and controlling oil spilled in water, which method comprises spreading around the periphery of said oil a liquid composition consisting essentially of
   (a) from 0.1 to 95.0% of a fluorochemical of the formula $(R_f)_n TmZr$ 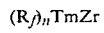

where n is 1 or 2;
   m is 0 or 1;
   r is 1 or 2;
   $R_f$ is a straight or branched chain perfluoroalkyl group of 1 to 20 carbon atoms or said perfluoroalkyl substituted by perfluoroalkoxy of 2 to 6 carbon atoms, or said perfluoroalkyl containing at most one chlorine or hydrogen atom for every two carbon atoms;
   T is a covalent bond, or a connecting group with a functionality of n+r for linking a maximum of 2 $R_f$ groups and 2 Z groups, the connecting group T being R or $R_3(X—R_4)_p$ wherein $R_3$ and $R_4$ are independently straight or branched chain, saturated or unsaturated, or halo substituted, alkylene or arylene of up to 12 carbon atoms, X is thio, oxy or imino where the nitrogen in said imino is secondary or tertiary and p is 1 to 4;
   Z is one or two neutral or polar groups selected independently from —$CONR_1R_2$, —OH, —CN, —$CONR_1COR_2$, —$SO_2NR_1R_2$, —$O_2CR_1$ and —$CO_2R_1$, where $R_1$ and $R_2$ are independently hydrogen, straight or branched chain alkyl or 1 to 12 carbon atoms or straight or branched chain alkyl of 1 to 12 carbon atoms substituted by one or more of —OH, —$COCH_3$ or —$CONHCH_3$, and where said $R_f$ contains more than 6 carbon atoms Z may also be substituted by —$CO_2H$, —$SO_3H$, —$PO(OH)_2$, —$OSO_3H$, —$S_2O_3Na$ or quaternary ammonium; with the proviso that said fluorochemical has a solubility in water less than 0.01% by weight;
   (b) from 5 to 99.9% of a diluent in which said fluorochemical is at least 0.1% soluble and which diluent has a solubility in water greater than 0.01%; and
   wherein said fluorochemical exhibits a persistent spreading pressure greater than 50 dynes/cm at less than 10 mg./sq. meter, such that said composition forms a durable, rapidly spreading, water insoluble surface film to contract, collect and control said oil.

2. A method according to claim 1 wherein the $R_f$ group is a perfluoroaliphatic group of 5 to 14 carbon atoms, said composition contains from 2% to 20% of said fluorochemical, and wherein said diluent consists essentially of a liquid ether or ester derivative of an alkylene glycol, alcohol or ketone in the presence or absence of an aliphatic alcohol having at most 3 carbon atoms.

* * * * *